July 29, 1969
R. B. DUNLAP
3,457,865
CONTROL APPARATUS
Filed March 20, 1967
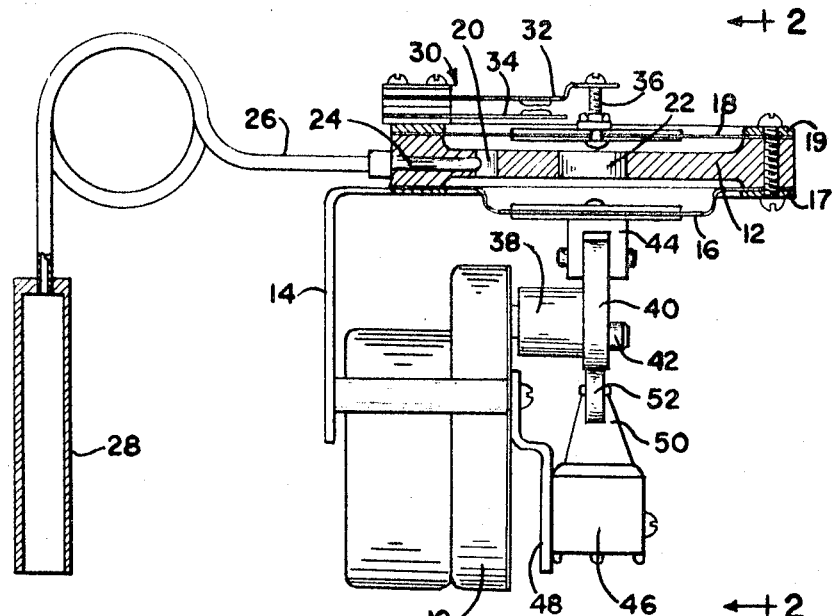
FIG. 1
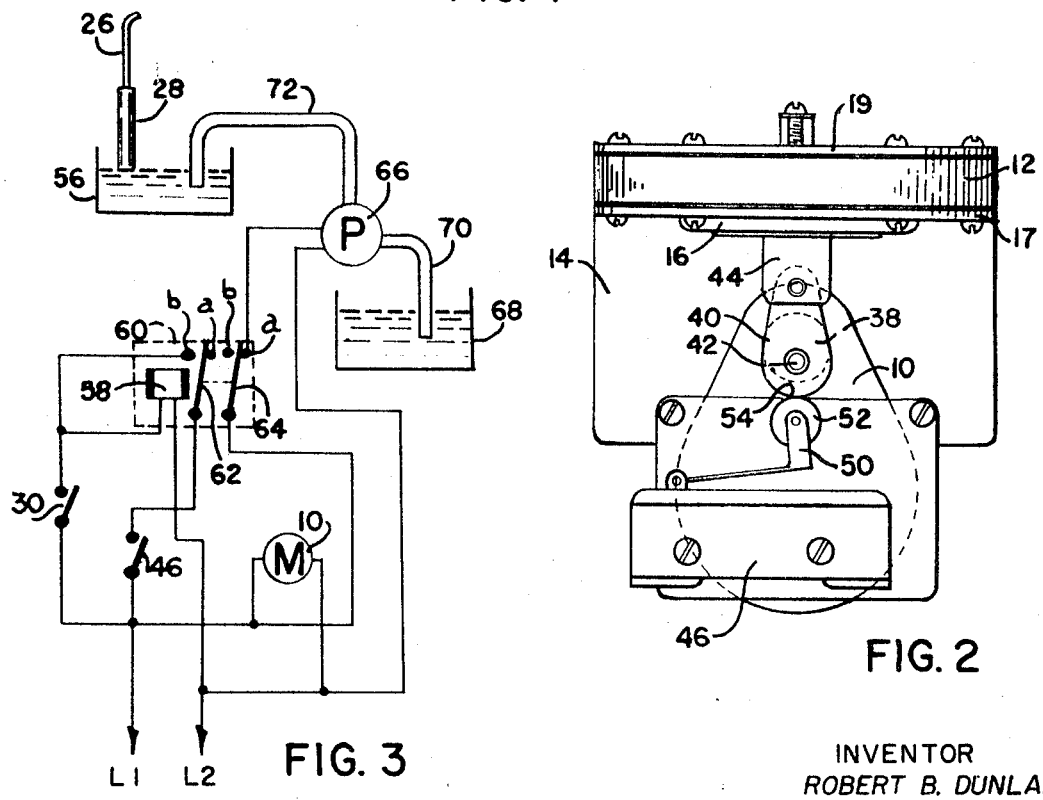
FIG. 3
FIG. 2
INVENTOR
*ROBERT B. DUNLAP*
BY *Albert Gordon*
ATTORNEY United States Patent Office 3,457,865
Patented July 29, 1969

3,457,865
CONTROL APPARATUS
Robert B. Dunlap, Kelly St., Medway, Mass. 02053
Filed Mar. 20, 1967, Ser. No. 624,352
Int. Cl. F04b 49/02; F04d 15/00; F16k 31/145
U.S. Cl. 103—25                                    8 Claims

ABSTRACT OF THE DISCLOSURE

There is disclosed herein a control apparatus for controlling the level of the fluent material in a container by means of a tube that is normally immersed in the container and a pump that is caused to pump fluent material from a source into the container in response to the fluent material in the container falling below the level of the tube.

---

This invention relates to a control apparatus for actuating a control member in response to a change in a condition. The apparatus comprises a pair of diaphragms that define between them an enclosure that is airtight except for a conduit means leading to a tube. When the tube is blocked by a change in a condition, a flexing of one of the diaphragms causes a flexing of the other diaphragm which in turn causes actuation of a control member.

In the illustrative embodiment of the invention, the change in condition is the decrease of the level of fluent material in a container from a desired level which unblocks the tube initially immersed in the fluent material. The control member, upon actuation, causes operation of a pump to pump fluent material into the container to thereby return the fluent material to the desired level.

In the drawings:

FIGURE 1 is a side elevation of the control apparatus;
FIGURE 2 is a view taken on the line 2—2 of FIGURE 1; and
FIGURE 3 is a schematic representation of the electrical circuit of the apparatus and of the pump and container.

The device comprises a motor 10 to which a base 12 is secured by a brace 14. A flexible diaphragm 16 is secured by a ring 17 to the bottom of the base 12 to form an airtight connection with the base. A flexible diaphragm 18 is secured by a ring 19 to the top of the base to form an airtight connection with the base. The diaphragms 16 and 18 are spaced from the base so that an enclosure is formed between the diaphragms. Apertures 20 and 22 extend through the base 12 and provide communication between the diaphragms 16 and 18. A bore 24 extends from the aperture 20 to the front of the base 12. One end of a flexible conduit 26 is secured to the base 12 so as to be in air tight communication with the bore 24. A tube 28 is in air tight communication with the other end of the conduit 26.

An actuator, in the form of a switch 30, secured to the base 12, has a pair of switch blades 32 and 34 that extend above the diaphragm 18. The blade 32 is connected to the diaphragm 18 by a switch operator 36. With the diaphragm 18 in the position shown in FIGURE 1, the blades 32 and 34 are spaced from each other and the switch 30 is open.

A crank 38 is connected to the motor 10 so as to be rotated by the motor. A link 40 is mounted on a pin 42 that is eccentrically mounted on the crank 38 on an axis that is eccentric with respect to the axis of rotation of the crank. A bracket 44 is pinned to the link 40 and is secured to the diaphragm 16. A normally closed breaker switch 46, secured to the motor 10 by a brace 48, has a conventional actuator 50 that is yieldably urged upwardly. A roll 52, secured to the actuator 50, is in alignment with and bears against a cam surface 54 on the bottom of the pitman 40.

The device is used to maintain fluent material in a container 56 (FIGURE 3) at a desired level. The tube 28 is immersed in the fluent material with its bottom at the desired level and the motor 10 is turned on. As shown in FIGURE 3, the electric control system includes a source of power labelled L1 and L2 so connected to the motor 10 as to cause it to rotate when it is turned on. The rotation of the motor, by means of the members 38, 40, 42 and 44, causes the diaphragm 16 to reciprocate towards and away from the base 12. Since the conduit 26 is cut off from the atmosphere because of the tube 28 being blocked by being immersed in the fluent material in the container 56, each downstroke of the diaphragm 16 creates a suction force that, through the aperture 22, sucks down the diaphragm 18 to thereby cause the connector 36 to lower the switch blade 32 and close the switch 30.

The closure of the switch 30 energizes a coil 58 of a relay 60. The relay 60 includes a control switch arrangement formed by two control members or switches 62 and 64, and the relay is so constructed that the switches 62 and 64 are moved from terminals a to terminals b when the coil 58 is energized and are moved back to terminals b when the coil 58 is deenergized. When the switch 64 is in contact with its terminal a, a circuit is closed to turn on a pump 66 which causes fluent material to be pumped from a source 68, through conduits 70 and 72, into the container 56. When the switch 64 is in contact with its terminal b, the pump 66 is shut off. While the tube 28 is immersed in the fluent material the coil 58 remains energized during each upstroke of the diaphragm 16 by means of a holding circuit going through the normally closed switch 46, the terminal b of the switch 62 and the coil.

Should the tube 28 be exposed to atmosphere due to the lowering of the level of the fluent material in the container 56, the next downstroke of the diaphragm 16 does not create the suction force to lower the diaphragm 18 and close the switch 30 as the air flow caused by the downstroke of the diaphragm 16 escapes to atmosphere through the aperture 20 and the conduit means formed by the bore 24, the conduit 26 and the tube 28. The switch 30 therefore stays open during this downstroke of the diaphragm 18. At the bottom of this dowstroke the cam surface 54 engages the roll 52 to lower the actuator 50 and thereby open the switch 46 to open the holding circuit to the coil 58 and deenergize the coil. The deenergization of the coil causes the switches 62, 64 to move back to their terminals a which turns on the pump 66 so as to cause fluent material to be pumped from the source 68 into the container 56. When sufficient fluent material has been pumped into the container 56 to again cause the tube 28 to be immersed in the fluent material, the pump 66 is shut off.

I claim:
1. A control apparatus comprising: a control member; a first flexible diaphragm; a second flexible diaphragm; means mounting the diaphragms so as to form an enclosure therebetween; a tube; conduit means extending from said tube into said enclosure; means so constructing the enclosure that it is substantially airtight except for said conduit means whereby a blocking of the tube will enable a flexing of the first diaphragm to cause a flexing of the second diaphragm; means for reciprocating the first diaphragm in directions that are toward and away from the second diaphragm to effect said flexing of the second diaphragm; an actuator operative to actuate the control member; and an operator connected to the second diaphragm and to the actuator so constructed as to cause operation of the actuator in response to the flexure of the second diaphragm to thereby actuate the control member.

2. The apparatus as defined in claim 1 further comprising: means so constructing the second diaphragm, the operator and the actuator as to cause the operation of the actuator in response to the flexing of the second diaphragm caused by the flexing of the first diaphragm in a first of said directions when the tube is blocked; and holding means enabling the control member to remain actuated during the flexing of the first diaphragm in the second of said directions.

3. The apparatus as defined in claim 2 further comprising: means effective to open said holding means in response to the unblocking of said tube to thereby deactuate the control member.

4. The apparatus as defined in claim 3 further comprising: a container adapted to contain fluent material at a desired level, said tube being normally immersed in the fluent material with the tube bottom below said desired level so that the tube is blocked by the fluent material; a source of fluent material; a pump operatively connected to the container and the source so as to be actuable to pump the fluent material from the source into the container; and means responsive to the deactuation of the control member by the unblocking of the tube due to the fluent material falling below the level of the tube bottom to actuate the pump.

5. A control apparatus comprising: a control member; a first flexible diaphragm; a second flexible diaphragm; means mounting the diaphragms so as to form an enclosure therebetween; a tube; conduit means extending from said tube into said enclosure; means so constructing the enclosure that it is substantially airtight except for said conduit means whereby a blocking of the tube will enable a flexing of the first diaphragm to cause a corresponding flexing of the second diaphragm; means for reciprocating the first diaphragm in directions that are toward and away from the second diaphragm; a switch; an operator connected to the second diaphragm and to the switch so constructed as to close the switch in response to flexure of the second diaphragm caused by the flexing of the first diaphragm in a first of said directions when the tube is blocked; an operating circuit operative to actuate the control member in response to closure of the switch; a holding circuit enabling the control member to remain actuated during the flexing of the first diaphragm in the second of said directions when the tube is blocked; and means effective to break the holding circuit in response to the unblocking of said tube to thereby deactuate the control member.

6. The apparatus as defined in claim 5 further comprising: a container adapted to contain fluent material at a desired level, said tube being normally immersed in the fluent material with the tube bottom below said desired level so that the tube is blocked by the fluent material; a source of fluent material; a pump operatively connected to the container and the source so as to be actuable to pump the fluent material from the source into the container; and means responsive to the deactuation of the control member by the unblocking of the tube due to the fluent material falling below the level of the tube bottom to actuate the pump.

7. A control apparatus comprising: a control switch arrangement movable between a first position and a second position; a coil operative when energized to cause movement of the control switch arrangement from its first to its second position and operative when deenergized to cause movement of the control switch arrangement from its second to its first position; a first flexible diaphragm; a second flexible diaphragm; means mounting the diaphragms so as to form an enclosure therebetween; a tube; conduit means extending from said tube into said enclosure; means so constructing the enclosure that it is substantially airtight except for said conduit means whereby a blocking of the tube will enable a flexing of the first diaphragm to cause a corresponding flexing of the second diaphragm; means for reciprocating the first diaphragm towards and away from the second diaphragm; a normally closed breaker switch; a normally open actuating switch; an operator connected to the second diaphragm and to the actuating switch so constructed as to close the actuating switch in response to the flexure of the second diaphragm toward the first diaphragm caused by the flexing of the first diaphragm away from the second diaphragm when the tube is blocked and to open the actuating switch in response to the flexure of the second diaphragm away from the first diaphragm caused by the flexing of the first diaphragm towards the second diaphragm when the tube is blocked; circuitry interconnecting the actuating switch and the coil operative to energize the coil to move the control switch arrangement from its first position to its second position in response to the closure of the actuating switch; a holding circuit interconnecting the breaker switch and the control switch arrangement operative to maintain the coil energized when the control switch arrangement is in its second position and the breaker switch is closed; and means, operative during each reciprocation of the first diaphragm at a time when the operator, during the blocking of the tube, is effective to close the actuating switch, to momentarily open the breaker switch, whereby the coil is deenergized when the tube is unblocked to cause the control switch arrangement to move from its second position to its first position.

8. The apparatus as defined in claim 7 further comprising: a container adapted to contain a supply of fluent material at a desired level, said tube being normally immersed in the fluent material with the tube bottom below said desired level so that the tube is blocked by the fluent material; a source of fluent material; a pump operatively connected to the container and the source so as to be actuatable to pump the fluent material from the source into the container; and means responsive to the movement of the control switch arrangement from its second position to its first position by the unblocking of the tube due to the fluent material falling below the level of the tube bottom to actuate the pump.

References Cited

UNITED STATES PATENTS 2,767,277 10/1956 Wirth _____ 103—25 X
3,058,485 10/1962 McQueen _____ 137—414 X
3,292,547 12/1966 Ward _____ 103—11

WILLIAM F. O'DEA, Primary Examiner

DAVID R. MATTHEWS, Assistant Examiner

U.S. Cl. X.R.

137—394, 414; 251—331